United States Patent [19]

Reinicke et al.

[11] 3,945,395
[45] Mar. 23, 1976

[54] VENT AND RELIEF VALVE
[75] Inventors: Robert H. Reinicke, Mission Viejo; Richard L. Kenyon, Costa Mesa, both of Calif.
[73] Assignee: Parker-Hannifin Corporation, Cleveland, Ohio
[22] Filed: July 11, 1974
[21] Appl. No.: 487,612

[52] U.S. Cl. ................. 137/495; 137/488; 137/493
[51] Int. Cl.² ................... F16K 45/00; F16K 17/00
[58] Field of Search ........ 137/495, 488, 493, 493.9, 137/493.1, 493.2, 493.6, 493.3, 493.4, 493.5; 251/175, 333, 63, 63.6

[56] References Cited
UNITED STATES PATENTS

| | | | |
|---|---|---|---|
| 1,156,941 | 10/1915 | Stevens | 251/63.6 |
| 1,821,189 | 9/1931 | Meinken et al. | 137/493.9 X |
| 2,288,882 | 7/1942 | Binckley | 137/493.9 |
| 3,228,409 | 1/1966 | Godel | 137/493.9 X |
| 3,820,560 | 6/1974 | Leemann | 137/493.4 |

FOREIGN PATENTS OR APPLICATIONS

| | | | |
|---|---|---|---|
| 518,482 | 2/1940 | United Kingdom | 137/493 |

*Primary Examiner*—Martin P. Schwadron
*Assistant Examiner*—Robert J. Miller
*Attorney, Agent, or Firm*—Donnelly, Maky, Renner & Otto

[57] ABSTRACT

A vent and relief valve for a tank containing pressurized fluid such as oxygen or hydrogen characterized in that coaxial vent and relief valve members have interengaged seats to close the vent outlet of the valve, the vent valve member having actuating means associated therewith to disengage said seats to open communication between the interior of the tank and the vent outlet of the valve as during filling of the tank, and the relief valve member being actuated by fluid pressure in the tank exceeding a predetermined value to move said relief valve member to disengage said seats and thereby again establish communication between the interior of the tank and the vent outlet of the valve thus to vent excess fluid pressure.

12 Claims, 4 Drawing Figures

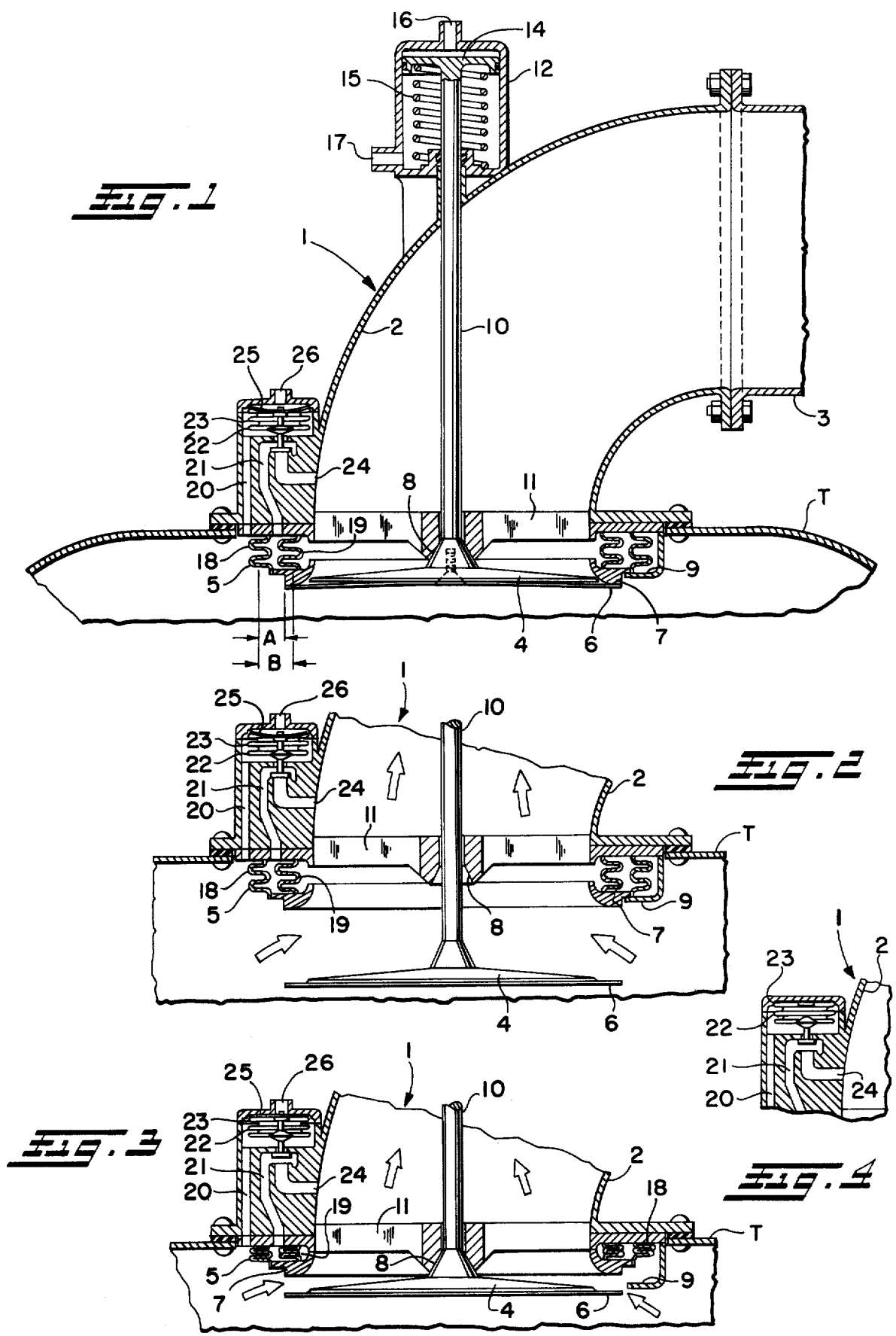

VENT AND RELIEF VALVE

BACKGROUND OF THE INVENTION

Pressurized fluid tanks generally include a vent opening at the top thereof and the vent duct has an elbow connection with the top of the tank, the vent and relief valve either being interposed between the elbow and the tank or mounted in the vent duct downstream of the elbow. In either case, one known form of vent and relief valve comprises a main valve member which is pivotally mounted in the valve body and which is linked to a gas pressure actuator to swing the main valve member to open position as during filling of the tank, and to a tank pressure sensing valve which via a booster swings the main valve member to open position in the event that tank pressure builds up above a predetermined value. In a valve installation as just described a tank pressure sensing line is provided and it must have a tank pressure seal connection with the tank and with the valve body and when the valve is mounted in the vent duct there must be a tank pressure seal between the elbow and valve body in addition to the tank pressure seal connection of the elbow to the top of the tank.

Such known vent and relief valve construction is quite heavy, complex and expensive and, in the case of a valve mounted between the tank and the elbow, additional vertical clearance space is required above the tank.

SUMMARY OF THE INVENTION

In contradistinction to the foregoing the present vent and relief valve is of simple and inexpensive construction and requires only a tank pressure seal connection between the vent elbow and the upper end of the pressurized fluid tank, the vent duct, elbow and the valve body being one and the same part.

It is a principal object of this invention to provide a vent and relief valve of the character indicated in which the vent valve member and relief valve member are coaxially arranged in the valve body and have interengaged seats to prevent escape of pressurized fluid, the vent member having associated therewith an actuator for moving it away from the relief valve member seat for venting of the tank as during filling thereof, and the relief valve member being actuated away from the vent valve member seat in response to tank pressure exceeding a predetermined value.

It is another object of this invention to provide a vent and relief valve of the character indicated in which the relief valve movements do not entail any sliding seals or friction thus to provide for very accurate, repeatable and reliable relief valve operation.

It is another object of this invention to provide a vent and relief valve of the character indicated in which the vent valve in open position provides a vent passage with low pressure drop for free flow of fluid from the tank into the vent duct.

It is another object of this invention to provide a compact and lightweight vent and relief valve of the character indicated in which the relief and vent actions are independent so that if one fails to open, the valve can yet be opened by the other.

It is another object of this invention to provide a vent and relief valve of the character indicated in which the operation of the relief valve member as aforesaid is under the control of a pilot valve which conducts tank pressure to a pressure seating chamber of the relief valve member to maintain the relief valve member in seating engagement with the vent valve member at tank pressures below a predetermined value, said pilot relief valve being operative to vent the pressure seating chamber to the downstream side of the relief valve member when the tank pressure exceeds such predetermined value whereupon tank pressure urges the relief valve member to disengage said seats for relief of excess tank pressure to the vent duct.

BRIEF DESCRIPTION OF THE DRAWING

FIG. 1 is a cross-section view of a vent and relief valve embodying the present invention;

FIGS. 2 and 3 are fragmentary cross-section views respectively showing the vent valve member actuated to open position to vent the tank as during filling of the same with pressurized fluid and showing the relief valve member in open position to relieve excess pressure from within the tank; and FIG. 4 is a fragmentary cross-section view of a modification.

DETAIL DESCRIPTION OF A PREFERRED EMBODIMENT

As best shown in FIG. 1 the vent and relief valve 1 herein shown comprises a valve body 2 preferably in the form of an elbow having flanges at its ends respectively secured to the top of a tank T containing pressurized fluid such as oxygen, hydrogen or the like and to a vent duct 3. The end of the valve body 2 which is connected to the tank T has associated therewith a vent and relief valve assembly comprising a vent valve member 4 and a relief valve member 5 having interengaged seat members 6 and 7 of which the seat member 6 is in the form of a flexible metallic disc having its central portion secured to the center of the vent valve member 4. Said valve body 2 and said vent valve and relief valve members 4 and 5 have interengageable stop surfaces 8 and 9 whereby downward movement of the vent valve member 4 (see FIG. 2) will effect disengagement of said seat members 6 and 7 to vent the tank T as during filling thereof, and upward movement of the relief valve member 5 (see FIG. 3) will effect similar disengagement of said seat members 6 and 7 to relieve tank pressure exceeding a predetermined value. The stops 9 may comprise three or more equally spaced apart narrow angular lugs engaged by seat member 7.

The stem 10 of the vent valve member 4 extends through a spider 11 in the valve body 2 and is slidably sealed in one end of an actuating cylinder 12, said valve stem 10 having thereon a piston 14 slidably sealed in said cylinder 12 and having associated therewith a spring 15 which together with tank pressure tends to hold the vent valve member 4 in closed position with the seats 6 and 7 in engagement with each other when the cylinder port 16 is vented. When air under pressure is admitted into the port 16, the vent valve member 4 will be moved downwardly to open position as shown in FIG. 2 to vent the tank T as during filling thereof with fluid such as oxygen, hydrogen, or the like and, when the port 16 is vented, tank T pressure and spring 15 pressure will move the vent valve member 4 upwardly to engage the seats 6 and 7. Should the vent valve member 4 tend to stick in open position, air pressure may be admitted into the other port 17 of the cylinder 12 to exert additional closing force to move the vent valve member 4 to closed position.

The relief valve member 5 herein is shown as comprising spring metal bellows 18 and 19 and interengaged seat members 6 and 7 forming an annular area A which is continuously exposed to tank pressure, and spring metal bellows 18 and spring metal bellows 19 having a larger annular area B therewithin which is also exposed to tank pressure via the passages 20 and 21 when the pilot valve 22 is in the position shown in FIGS. 1 and 2, the pilot valve 22 using bellows 23 to sense tank pressure being yieldably urged to normally close the vent passage by a Belville spring 25. The port 26 is a vent port, and exposes the interior of bellows 23 to ambient pressure.

When the tank pressure builds up to exceed a predetermined value, the pilot valve 22 will be forced upwardly by tank pressure acting on the area of the bellows thereof to restrict communication between the passages 20 and 21 as shown in FIG. 3 and to allow communication between the passages 21 and 24 whereby the pressure in the relief valve seating chamber of area B will be decreased substantially below tank pressure whereupon the tank pressure of such predetermined value acting on area A will urge the relief valve member 5 upwardly as shown in FIG. 3 to relieve excess tank pressure. When the tank pressure decreases to less than such predetermined value, the pilot valve 22 will be urged downwardly by the bellows and Belville spring 25 to fully open communication between the passages 20 and 21 and to close the vent passage 24 whereby tank pressure builds up in the pressure seating chamber of area B thus to urge the relief valve member 5 to closed position with the seat members 6 and 7 in interengagement as shown in FIG. 1.

The foregoing relief operation as shown in FIG. 3 limits tank pressure to a maximum differential pressure above ambient pressure. FIG. 4 shows the interior of bellows 23 evacuated of air pressure and sealed, thereby limiting tank pressure to a maximum absolute pressure level, should this type control be desired.

When the seats 6 and 7 are disengaged either by downward movement of the vent valve member 4 or by upward movement of the relief valve member 5, the flexible yieldable seat 6 will be supported by the peripheral portion of the vent valve member 4 against fluttering.

By reason of the provision of bellows type relief valve and pilot valve members 5 and 22 there are no sliding seals or friction in connection with the movements of the relief valve. Avoidance of friction and dynamic seal leakage provides very accurate, repeatible, and reliable relief valve operation.

The spider 11 arms are streamlined, and the valve stem 10 is very small in relation to the vent passage area, and the vent valve member 4 is extended well into the tank when open as shown in FIG. 2. By reason of the curved formation of the inner wall of the relief valve seat member 7 there is provided a bell mouth. These features provide an exceptionally low pressure drop for flow of fluid in FIG. 2 from within the tank T into the valve body and out through the vent duct 3.

The moving mechanical parts of the relief action and vent action are completely independent. Should either of these mechanisms fail to open, the valve can still be opened by the remaining unfailed mechanism to prevent excessive tank pressure. This fully redundant opening capability is provided in a very compact and lightweight unit.

The embodiments of the invention in which an exclusive property or privilege is claimed are defined as follows:

1. A vent and relief valve comprising a valve body having a vent passage therethrough communicating at one end with the interior of a tank containing pressurized fluid; coaxial vent valve and relief valve members at such one end movable axially in said body and having interengaged seats to close said passage to retain pressurized fluid within said tank; actuating means operatively connected to said vent valve member to move the same axially in one direction with respect to said relief valve member to disengage said seats for venting said tank through the other end of said passage as during filling of the tank; said relief valve member having an area thereof exposed to fluid pressure in said tank and being moved axially in the opposite direction with respect to said vent valve member to disengage said seats in response to fluid pressure in said tank acting on said area exceeding a predetermined value to relieve tank pressure greater than such predetermined value through the other end of said passage; said body having pilot pressure and vent passages respectively communicating with tank pressure and with said body vent passage downstream of said seats, and a control passage leading to a seating chamber to which an opposite area of said relief valve member is exposed; and a tank pressure actuated pilot valve movable in said body and communicating said control passage with said pilot pressure passage in response to tank pressure being less than such predetermined value and with said pilot vent passage in response to tank pressure exceeding such predetermined value whereby reduced pressure in said chamber acting on such opposite area permits tank pressure acting on the first-mentioned area of said relief valve member to urge said relief valve member to disengage its seat from said vent valve member seat.

2. A vent and relief valve comprising a valve body having a vent passage therethrough communicating at one end with the interior of a tank containing pressurized fluid; coaxial vent valve and relief valve members at such one end movable axially in said body and having interengaged seats to close said passage to retain pressurized fluid within said tank; actuating means operatively connected to said vent valve member to move the same axially in one direction with respect to said relief valve member to disengage said seats for venting said tank through the other end of said passage as during filling of the tank; said relief valve member having an area thereof exposed to fluid pressure in said tank and being moved axially in the opposite direction with respect to said vent valve member to disengage said seats in response to fluid pressure in said tank acting on said area exceeding a predetermined value to relieve tank pressure greater than such predetermined value through the other end of said passage; said vent valve member being in the form of a poppet valve member having a radially outer peripheral seat; said relief valve being annular and having a radially inner peripheral seat; said relief valve member comprising an annular bellows which is fixed at one end to said body and which is exposed at the other end to tank pressure on an annular area surrounding its seat; said body having a pilot pressure passage and a tank pressure actuated pilot valve movable in said body to conduct tank pressure from said pilot pressure passage into said bellows to act on another annular area within said bellows to retain said relief valve member in closed position at tank pressures less than predetermined value; said pilot valve being movable in said body by tank pressure exceeding said predetermined value and being operative when thus moved to close communication of said pilot pressure passage with said another annular area and to vent said another annular area into said body vent passage downstream of said interengaged seats whereby tank pressure acting on said annular area is effective to move said relief valve member in such opposite direction with respect to said vent valve member to disengage said seats for flow of fluid from within said tank into said body vent passage in response to tank pressure exceeding such predetermined value.

3. A vent and relief valve comprising a valve body having a vent passage therethrough communicating at one end with the interior of a tank containing pressurized fluid; coaxial vent valve and relief valve members at such one end of said body vent passage movable in said body from a position closing said passage to retain pressurized fluid within said tank to a position whereat said vent valve member opens said passage to vent said tank through said passage as during filling of the tank and whereat said relief valve member opens said passage in response to fluid pressure in said tank exceeding a predetermined value thus to relieve tank pressure greater than such predetermined value; said body having pilot pressure and vent passages respectively communicating with tank pressure and with said body vent passage downstream of said valve members, and a control passage leading to a seating chamber in said relief valve member; and a pilot valve movable in said body to communicate said control passage with said pilot pressure passage in response to tank pressure being less than such predetermined value and with said pilot vent passage in response to tank pressure exceeding such predetermined value whereby reduced pressure in said chamber permits tank pressure to move said relief valve member to body vent passage opening position.

4. A vent and relief valve comprising a valve body having a vent passage therethrough communicating at one end with the interior of a tank containing pressurized fluid; coaxial vent valve and relief valve members at such one end of said body vent passage movable in said body from a position closing said passage to retain pressurized fluid within said tank to a position whereat said vent valve member opens said passage to vent said tank through said passage as during filling of the tank and whereat said relief valve member opens said passage in response to fluid pressure in said tank exceeding a predetermined value thus to relieve tank pressure greater than such predetermined value; said vent valve and relief valve members, in passage closing position, having interengaged seats; said body having stop means alternately engaged with said valve members during movement of said vent valve member to passage opening position with respect to said relief valve member and vice versa; said vent valve member being in the form of a poppet valve member having a radially outer peripheral seat engaged with the inner peripheral seat of an annular relief valve member; said relief valve member comprising an annular bellows which is exposed to tank pressure on an annular area surrounding its seat; said body having a pressure passage and a tank pressure actuated pilot valve movable in said body to conduct tank pressure from said pressure passage into said bellows to act on another annular area to retain said relief valve member in closed position at tank pressures less than predetermined value; said pilot valve being operative to close said pressure passage and to vent said another annular area into said body vent passage downstream of said interengaged seats whereby tank pressure acting on said annular area is effective to move said relief valve member to disengage said seats for flow of fluid from within said tank into said body vent passage in response to the tank pressure acting on said pilot valve exceeding such predetermined value.

5. A vent and relief valve for a tank containing pressurized fluid; said valve comprising a body having a passage connectable at one end to the interior of said tank and at the other end to the exterior of said tank; a valve seat encircling said one end of said passage; a valve element movable in said body and spring pressed toward said seat and when thereagainst closing said passage; stop means in said body to limit movement of said valve element toward said seat; said seat being movable in said body toward and away from said element when the latter is engaged with said stop means; said seat having a first area constantly subject to pressure of fluid within said tank tending to urge said seat away from said valve element, and having a second area larger than the first area subject to pressure of fluid within said tank tending to urge said seat toward said valve element; and a tank pressure actuated pilot valve movable in said body and responsive to pressure of fluid in said tank less than such predetermined value for exposing said second area to pressure of fluid in said tank for moving said seat toward said valve element, and responsive to fluid in said tank at pressure greater than such predetermined pressure to expose said second area to a fluid pressure lower than said tank pressure whereby fluid pressure on said first area will move said seat away from said valve element.

6. The valve of claim 5 in which another stop means in said body limits movement of said seat toward said element; and in which actuator means operatively connected to said element moves said element to passage opening position away from said seat when said seat is against said another stop means.

7. The valve of claim 6 in which said actuator means comprises a piston on said valve element subject to fluid pressure other than tank pressure for moving said element to said passage opening position.

8. The valve of claim 5 in which said pilot valve has an actuator portion with a first area exposed to ambient pressure and a second area opposed to said first area of said actuator portion and exposed to fluid pressure in said tank.

9. The valve of claim 8 in which said pilot valve, when actuated by said actuator portion, exposes said second area of said seat to the outlet end of said passage.

10. A vent and relief valve comprising a valve body in the form of a curved elbow having a curved vent passage therethrough of substantially uniform diameter; coaxial vent and relief valve members at one end of said passage having interengaged seats of diameter at least as great as that of said curved vent passage closing said passage and movable in said body to open said passage when said vent valve member is moved axially in one direction with respect to said relief valve member and when said relief valve member is moved axially in the opposite direction with respect to said vent valve member; actuator means operatively connected to said vent valve member for so moving said vent valve member at will; said relief valve member being fluid pressure actuated and being so moved responsive to predetermined fluid pressure differential acting on opposite sides thereof; said body having a pilot valve at such one end laterally adjacent to said passage and movable in said body to selectively communicate a pressure seating chamber in said relief valve member with pilot pressure and vent passages respectively leading to the upstream and downstream sides of said relief valve member.

11. The valve of claim 10 wherein said pilot valve is movable responsive to predetermined fluid pressure on the upstream side and said chamber of said relief valve member to open communication between said chamber and said pilot vent passage whereby such fluid pressure acting on the upstream side of said relief valve member moves the latter to open said body vent passage.

12. The valve of claim 11 wherein said pilot vent passage opens into said body vent passage.

* * * * *